(12) United States Patent
Bressieux et al.

(10) Patent No.: US 6,747,079 B2
(45) Date of Patent: Jun. 8, 2004

(54) METHOD FOR STABILISING SILICONE ELASTOMER MOULDS

(75) Inventors: Jérôme Bressieux, Lyons (FR); Thomas Deforth, Lyons (FR); Christian Pusineri, Serezin du Rhône (FR)

(73) Assignee: Rhodia Chimie (FR)

( * ) Notice: Subject to any disclaimer, the term of this patent is extended or adjusted under 35 U.S.C. 154(b) by 0 days.

(21) Appl. No.: 10/239,357

(22) PCT Filed: Mar. 23, 2001

(86) PCT No.: PCT/FR01/00884

§ 371 (c)(1),
(2), (4) Date: Nov. 20, 2002

(87) PCT Pub. No.: WO01/72888

PCT Pub. Date: Oct. 4, 2001

(65) Prior Publication Data

US 2003/0149170 A1 Aug. 7, 2003

(30) Foreign Application Priority Data

Mar. 24, 2000 (FR) .............................. 00 03804

(51) Int. Cl.⁷ .................................. C08K 5/36
(52) U.S. Cl. ...................... 524/302; 524/748
(58) Field of Search ................. 524/302, 748

(56) References Cited

U.S. PATENT DOCUMENTS

| | | | | |
|---|---|---|---|---|
| 2,519,755 A | * | 8/1950 | Gribbins ..................... | 524/303 |
| 4,105,629 A | * | 8/1978 | Minagawa et al. ......... | 524/101 |
| 4,391,937 A | * | 7/1983 | Falender et al. ............ | 524/119 |
| 5,173,522 A | * | 12/1992 | Kubo ......................... | 524/62 |
| 5,286,788 A | * | 2/1994 | Shahid ....................... | 525/23 |
| 5,548,006 A | * | 8/1996 | Hirabayashi et al. ........ | 524/82 |
| 6,455,617 B1 | * | 9/2002 | Gay et al. ................... | 524/100 |

FOREIGN PATENT DOCUMENTS

| | | |
|---|---|---|
| EP | 03252447 | 11/1991 |
| FR | 2 773 165 | 7/1999 |
| JP | 09118818 | 6/1997 |

* cited by examiner

*Primary Examiner*—Margaret G. Moore
(74) *Attorney, Agent, or Firm*—Burns, Doane, Swecker & Mathis L.L.P.

(57) ABSTRACT

The invention concerns the use for increasing the life span of molds made of silicone elastomer crosslinking by polyaddition or polycondensation reaction, of an additive capable of stabilizing the silicone elastomer whereof the mold is constituted with respect to materials to be mouded, said additive corresponding the following formula (1) wherein $R^1$ and $R^2$ are linear or branched alkyl radicals or cycloaliphatic radicals having 1 to 40 carbon atoms. Preferably, said additive is methyl laurylthiopropionate. $C_{12}H_{25}$—S—$CH_2$—$CH_2$—CO—O—$CH_3$. The invention also concerns the corresponding silicone compositions and the resulting molds.

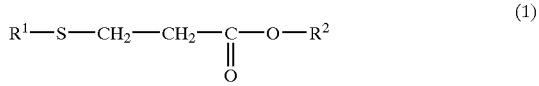

(1)

24 Claims, No Drawings

METHOD FOR STABILISING SILICONE ELASTOMER MOULDS

The present invention relates to the use of additives for the stabilization of the constituent silicone elastomers of molds resulting from the crosslinking of polyaddition or polycondensation compositions, in particular polycondensation compositions.

Another subject-matter of the invention is polyaddition and polycondensation compositions capable of being used for the preparation of these silicone elastomers.

A further subject-matter of the invention is the molds thus obtained for the reproduction by molding of decorative and industrial objects.

Another subject-matter of the invention is a process for the preparation of silicone molds.

Silicone compositions, in particular silicone polycondensation compositions, are used for the reproduction by molding of decorative and industrial objects. The reproduction of objects consists, in a first step, in manufacturing a negative of the object to be copied. This negative is prepared from silicone elastomer and is named "membrane". After crosslinking the silicone, the membrane is separated from the starting object. This membrane constitutes the mold which will be used for the reproduction of the object to be copied.

This type of mold is widely used for the reproduction of objects made of resin, such as polyester resin, capable of faithfully reproducing the finest details. However, during this use, the mold is subjected to gradual modifications: the constituents of the polyester resins, in particular styrene, diffuse into the membrane and are polymerized. The physicochemical structure of the mold in contact with the resins changes: it gradually hardens while losing its antiadhesive nature and its tear strength. These modifications finally result in surface fragments of the mold being torn off when the polyester item is removed from the mold. At this stage, the mold is no longer usable.

Various degradation mechanisms are involved. They can depend just as much on criteria related to the silicone elastomers as to the resins or to the molding conditions. It is probable that the polymerization mechanism is a radical mechanism: formation of free radicals, initiation and propagation of the radical polymerization of the styrene. High styrene or peroxide contents, the exothermic nature of the polymerization of the resin and the presence of oxygen are aggravating factors. The variety of the factors which can influence the degradation of the silicone mold means that, until now, the solutions provided have never been entirely satisfactory.

One means of improving the resistance to polyester resins of a silicone mold consists in introducing, into the elastomer, derivatives which may inhibit one or more phases of the radical polymerization.

European Patent Application EP-A-787 766 thus provides an improvement to the longevity of silicone molds by incorporating, in the polycondensation composition, an additive selected from a group composed of sterically hindered phenols, sterically hindered bisphenols, sterically hindered thiobisphenols, zinc dialkyldithiophosphates, zinc diaryldithiophosphates, aromatic amines or sterically hindered amines which can be 1-alkyl sebacates with a terminal NR group.

In FR-A-2 773 165, the additive is chosen from the group consisting of:
(a) antioxidant additives comprising, in their structure, at least one R—S$_q$—R' group in which R and R' are monovalent hydrocarbonaceous groups having at least 3 carbon atoms or a monovalent hydrocarbonaceous group having an ester bond or R and R' together form a ring, q being an integer of between 1 and 3 inclusive,
(b) additives which are inhibitors of free radicals and which are capable, under the conditions of the molding, of generating at least one group:

synergistic combination [lacuna] (a)+(b),
synergistic combination [lacuna] (a) and/or (b) with phosphites (c).

The additives of FR-A-2 773 165 include:
thiopropionates of formula:

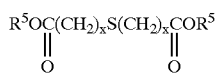

in which $R^5$ is an alkyl group having from 1 to 15 carbon atoms inclusive and x is an integer of between 1 and 4 inclusive, and preferably thiodipropionates (x=2) among which compounds may be mentioned:
  ditridecyl thiodipropionate (CAS 10595-72-9)
  distearyl 3,3'-thiodipropionate (CAS 693-36-7)
  dilauryl 3,3'-thiodipropionate (CAS 123-28-4);
  compounds comprising several thioether groups R—S$_q$—R' connected to a tetravalent carbon, preferably tetra(thioether)pentaerythritol, for example pentaerythritol tetra (laurylthiopropionate) or PETL (CAS 29598-76-3).

EP-A-854 167 provides several types of additives, including phenols, thiodipropionic acids, polysulfides, phosphonates, and the like, the phenols being sterically hindered.

The additives most often provided are phenols and thiodipropionic acids, the phenols being sterically hindered.

Furthermore, manufacturers seek to introduce these additives in the highest possible amount but come up against phenomena of exudation of the additive at the mold-molded component interface, which leads to inhibition of the polymerization of the resin layer which is in contact with the surface of the mold. It would be advantageous to have available additives which can be incorporated, without risks of exudation, in an amount sufficient to provide a high degree of protection.

The Applicant Company has found, unexpectedly, that compounds of thiomonopropionic type exhibit noteworthy advantages with respect to other known additives, including with respect to thiodipropionates. Thiomonopropionates make it possible to achieve high molar concentrations without, however, resulting in phenomena of exudation and thus of inhibition at the surface of the molded items, even after many consecutive molding operations. These additives can result in a performance in terms of number of molding operations which is unexpected in the light of what is generally obtained with conventional additives, including thiodipropionates.

A subject-matter of the present invention is thus the use, for increasing the longevity of molds made of silicone elastomer which crosslinks by a polyaddition or polycondensation reaction, preferably a polycondensation reaction, of an additive capable of stabilizing the silicone elastomer constituting the mold, in particular with respect to materials to be molded, the additive corresponding to the following formula (1):

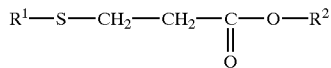

in which $R^1$ and $R^2$ are linear or branched alkyl radicals or cycloaliphatic radicals having from 1 to 40 carbon atoms.

In particular, but not exclusively, for the molding of objects having reliefs with a depth or thickness of greater than or equal to one millimeter and with a width or diameter of less than 1 to 5 mm, in particular of several millimeters, it is preferable to have $R^1+R^2>20$ carbon atoms. The additive is then a solid additive of waxy type. It is thus possible to have large amounts of additive in the reliefs of the mold, which additive will gradually melt during successive molding operations. The maximum C condensation (C number of $R^1+R^2$) is advantageously such that the melting point of the waxy additive is $\leq 150°$ C. Preferably, these waxy additives have a melting point $\geq 40°$ C., preferably of between 50 and 120° C. approximately. By way of example, the molding of the polyester is exothermic and the heat thus released makes it possible to provide for the gradual release of the additive.

In particular, but not exclusively, for the molding of objects not exhibiting such reliefs or objects comprising details which are not well marked, it is preferable to have $R^1+R^2\leq 20$ carbon atoms, in particular $6\leq R^1+R^2\leq 20$. The additive is liquid and can diffuse over time in a substantially continuous fashion, so as to maintain an appropriate amount of additive in the surface layer of the mold in contact with the component to be molded. More particularly, $6\leq R^1+R^2\leq 18$, preferably $8\leq R^1+R^2\leq 18$, more preferably still $10\leq R^1+R^2\leq 18$. $R^1+R^2\geq 8$ or 10 is particularly appropriate when, as is the case with polyester resins, the polymerization of the resin results in the release of a large amount of heat; $R^1+R^2\geq 8$ or 10 makes it possible to limit the possibilities of evaporation of the additive during successive molding operations.

These various additives have the advantage, however, of not exuding in an unfavorable way.

However, it should be noted that the two types of additives described above can be effectively used whatever the distinctive characteristics of the object to be molded.

According to a particularly advantageous form, at least one additive of each type is used simultaneously, so as to benefit from the distinctive characteristics and advantages of both.

By way of examples, $R^1$ can be $CH_3$, $C_2H_5$, $C_3H_7$, $C_4H_9$, $C_5H_{11}$, $C_6H_{13}$, $C_8H_{17}$, $C_{12}H_{25}$, $C_{16}H_{33}$ or $C_{18}H_{37}$ or alternatively cyclohexyl $C_6H_{11}$.

By way of examples, $R^2$ is $CH_3$, $C_2H_5$, $C_4H_9$ or tert-butyl.

Mention may be made, by way of preferred example, of methyl laurylthiopropionate, hereinafter referred to as MeLTP:

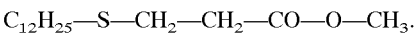

Generally, the content by weight of the additive in the overall silicone composition is between 0.1 and 15, more particularly between 0.2 and 10 and preferably between 0.5 and 5%.

These derivatives are particularly advantageous in so far as their affinity for silicone elastomers and their physical condition can be adjusted by varying the nature and the carbon condensation of the alkyl chains.

Furthermore, their method of synthesis is simple; they are formed by addition of an alkanethiol to an alkyl acrylate according to the following reaction scheme (2):

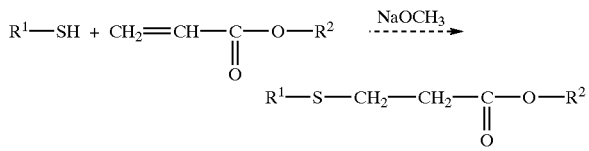

More particularly, a subject-matter of the invention is the use of such additives for the stabilization of the constituent silicone elastomers of molds intended for the molding of polyester items in order in particular to prevent, within the silicone elastomer, the polymerization of the styrene resulting from the polyester resin, without harming the polymerization at the core and at the surface of the polyester.

In a particularly preferred way, the use is targeted at obtaining a number of molding operations per mold which is increased by more than 20%, 50%, 80% or indeed even 100% with respect to what is generally obtained with conventional additives, e.g. thiodipropionates.

Another subject-matter of the invention is silicone compositions incorporating one or more of these additives.

Another subject-matter of the invention is a process for the preparation of silicone molds or of a silicone elastomer capable of being used for the preparation of such molds, in which one or more additives according to the invention is/are added to a conventional elastomer-precursor silicone composition.

All the characteristics given above apply to the various subject-matters of the invention (e.g. use, composition or preparation process).

The invention can be applied to silicone compositions which can be crosslinked at room temperature (it being possible for the crosslinking to be accelerated under warm conditions) by polyaddition or polycondensation reaction.

The present invention applies in particular to the silicone compositions which are a precursor of a silicone elastomer comprising:

(A) a diorganopolysiloxane oil exhibiting reactive groups chosen from i) condensable, hydrolyzable or hydroxyl terminal groups and 2i) alkenyl groups, preferably vinyl groups, bonded to silicon;

(B) optionally a compound chosen from the group consisting of silanes comprising condensable or hydrolyzable groups, in the case where (A) is chosen from the groups i), and of diorganopoly-siloxane oil carrying hydrogen atoms, in the case where (A) is chosen from the groups 2i);

(C) a catalyzt;

(D) optionally any other additive conventionally used in the type of composition under consideration;

(E) one or more additives according to the invention.

A first group of silicones which can be used according to the invention therefore comprises diorganopolysiloxane compositions which can be cured to a silicone elastomer by polycondensation reactions comprising:

(A): at least one diorganopolysiloxane oil carrying, at each end of the chain, at least two condensable or hydrolyzable groups or a single hydroxyl group, (B): a silane comprising at least three condensable or hydrolyzable groups and/or a product originating from the partial hydrolysis of this silane, when (A) is an oil with hydroxyl ends, (C): a catalyzt for the polycondensation of the oil, (E): one or more additives according to the invention.

In that which follows or that which precedes, unless otherwise mentioned, the percentages are by weight.

The diorganopolysiloxane oils (A) which can be used in the compositions according to the invention are more particularly those corresponding to the formula (3):

$$Y_nSiR_{3-n}O(SiR_2O)_xSiR_{3-n}$$

in which:
R represents identical or different monovalent hydrocarbonaceous radicals, Y represents identical or different hydrolyzable or condensable groups (other than OH) or hydroxyl groups,
n is chosen from 1, 2 and 3, with n=1 when Y is a hydroxyl, and x is an integer greater than 1, preferably greater than 10.

The viscosity of the oils of formula (3) is between 50 and $10^6$ mPa·s at 25° C.

Mention may be made, as examples of R radicals, of alkyl radicals having from 1 to 8 carbon atoms, such as methyl, ethyl, n-propyl, butyl, hexyl and octyl, vinyl radicals or phenyl radicals.

Mention may be made, as examples of substituted R radicals, of 3,3,3-trifluoropropyl, chlorophenyl and β-cyanoethyl radicals.

In the products of formula (3) generally used industrially, at least 60%, preferably at least 80%, by number of the R radicals are methyl radicals, the other radicals generally being phenyl and/or vinyl radicals (in particular at most 1%).

Mention may be made as examples of hydrolyzable Y groups, of the amino, acylamino, aminoxy, ketiminoxy, iminoxy, enoxy, alkoxy, alkoxy-alkyleneoxy, acyloxy and phosphato groups and, for example, among these:
for amino Y groups: n-butylamino, sec-butylamino and cyclohexylamino groups,
for N-substituted acylamino groups: the benzoyl-amino group,
for aminoxy groups: the dimethylaminoxy, diethylaminoxy, dioctylaminoxy and diphenylaminoxy groups,
for iminoxy and ketiminoxy groups: those derived from acetophenone oxime, acetone oxime, benzophenone oxime, methyl ethyl ketoxime, diisopropyl ketoxime and chlorocyclohexanone oxime,
for alkoxy Y groups: the groups having from 1 to 8 carbon atoms, such as the methoxy, propoxy, isopropoxy, butoxy, hexyloxy and octyloxy groups,
for alkoxyalkyleneoxy Y groups: the methoxyethyleneoxy group,
for acyloxy Y groups: the groups having from 1 to 8 carbon atoms, such as the formyloxy, acetoxy, propionyloxy and 2-ethylhexanoyloxy groups,
for phosphate Y groups: those deriving from the dimethyl phosphate, diethyl phosphate and dibutyl phosphate groups.

Mention may be made, as condensable Y groups, of hydrogen atoms and halogen atoms, preferably chlorine.

The oils (A) are preferably α,ω-dihydroxylated diorganopolysiloxanes of formula (3); then Y=OH, n=1 and x is such that the viscosity is between 500 and 500000 mPa·s at 25° C., preferably between 800 and 400000 mpa·s at 25° C.

These linear polymers are composed essentially of diorganosiloxyl units of formula ($R_2SiO$) However, the presence of other units, generally present as impurities, such as $RSiO_{3/2}$, $RSiO_{1/2}$ and $SiO_{4/2}$, is not excluded in the proportion in particular of at most 1% with respect to the number of diorganosiloxyl units.

Mention may be made, as illustration of units represented by the formula $R_2SiO$, of those of formulae:

$(CH_3)_2SiO$; $CH_3(CH_2=CH)SiO$; $CH_3(C_6H_5)SiO$; $CF_3CH_2CH_2(CH_3)SiO$; NC—$CH_2CH_2(CH_3)SiO$; NC—$CH_2CH_2(C_6H_5)SiO$.

The great majority of these base oils are commerically available from silicone manufacturers. Furthermore, their manufacturing techniques are well known; they are found disclosed, for example, in French Patents FR-A-1 134 005, FR-A-1 198 749, FR-A-1 226 745.

When, in the formula (3), the Y groups are hydroxyl groups, n is then equal to 1 and it is necessary, in order to prepare polyorganosiloxane elastomers from these polymers of formula (3), to use, in addition to the condensation catalysts, crosslinking agents (B) which are silanes of general formula:

$$R_{4-a}SiY'_a \tag{4}$$

in which:
R has the meanings given above in the formula (3), Y' represents identical or different hydrolyzable or condensable groups and a is equal to 3 or 4.

The examples given for the Y groups are applicable to the Y' groups.

It is desirable to use silanes of formula (4) even in the case where, in the oil (A), Y does not comprise hydroxyl groups. In this case, it is desirable to use Y groups of the oil (A) which are identical to the Y' groups of the silane (B).

Mention may more particularly be made, as examples of silanes (B) of formula (4), of polyacyloxysilanes, polyalkoxysilanes, polyketiminoxy-silanes and polyiminoxysilanes and in particular the following silanes:

$CH_3Si(OCOCH_3)_3$; $C_2H_5Si(OCOCH_3)_3$; $(CH_2=CH)Si(OCOCH_3)_3$; $C_6H_5Si(OCOCH_3)_3$; $CF_3CH_2CH_2Si(OCOCH_3)_3$; NC—$CH_2CH_2Si(OCOCH_3)_3$; $CH_2ClSi(OCOCH_2CH_3)_3$; $CH_3Si(ON=C(CH_3)C_2H_5)_2OCH_2CH_2OCH_3$; $CH_3Si(ON=CH—CH_3)_2OCH_2CH_2OCH_3$.

The above silanes (B), in combination with α,ω-dihydroxylated polydiorganosiloxanes of formula (3), can be used in single-component compositions which are stable with the exclusion of air.

Mention may be made, as examples of monomeric silanes of formula (4) which, in combination with α,ω-dihydroxylated polydiorganosiloxanes of formula (3), can advantageously be used in two-component compositions, of polyalkoxysilanes and in particular those of formulae:

$Si(OC_2H_5)_4$; $Si(O-n-C_3H_7)_4$; $Si(O—isoC_3H_7)_4$; $Si(OC_2H_4OCH_3)_4$; $CH_3Si(OCH_3)_3$; $CH_2=CHSi(OCH_3)_3$; $CH_3Si(OC_2H_4OCH_3)_3$; $ClCH_2Si(OC_2H_5)_3$; $CH_2=CHSi(OC_2H_4OCH_3)_3$.

The monomeric silanes described hereinabove can be substituted, in all or in part, by polyalkoxy-polysiloxanes, each molecule of which numbers at least two, preferably three, Y' groups; the other valencies of the silicon are satisfied by SiO and SiR siloxane bonds.

Mention may be made, as an example of a polymeric crosslinking agent, of poly(ethyl silicate).

Use is generally made of 0.1 to 20 parts by weight of crosslinking agent of formula (4) per 100 parts by weight of polymer of formula (3).

The crosslinking agents (B) of formula (4), whether they can be used for the preparation of single-component or two-component compositions, are products accessible on the silicones market; furthermore, their use in compositions which cure from room temperature is known; it figures in particular in French Patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

The polyorganosiloxane compositions which can be cured to an elastomer of the type which is described hereinabove can comprise in particular from 0.001 to 10 parts by weight, preferably from 0.05 to 3 parts by weight, of condensation catalyst (C) per 100 parts by weight of polysiloxane of formula (3).

The content of condensation catalyst in the single-component compositions is generally much lower than that used in the two-component compositions and can in particular be between 0.001 and 0.05 part by weight per 100 parts by weight of polysiloxane of formula (3).

These catalysts will be described in more detail later.

The compositions according to the invention can additionally comprise reinforcing or semi-reinforcing or bulking fillers which are preferably chosen from siliceous fillers.

The reinforcing fillers are preferably chosen from fumed silicas and precipitated silicas. They have in particular a specific surface, measured according to the BET method, of at least 50 m$^2$/g, preferably of greater than 70 m$^2$/g, a mean size of the primary particles preferably of less than 0.1 $\mu$m (micrometer) and a bulk density preferably of less than 200 g/liter.

These silicas can be incorporated as is or after having been treated with organosilicon compounds commonly used for this use. During these treatments, the silicas can increase their starting weight up to a level of 20%, preferably 18%, approximately. Siloxanes and cyclosiloxanes, e.g. methylpolysiloxanes, such as hexamethyldisiloxane, octamethyldisiloxane or octamethylcyclotetrasiloxane, silazanes, e.g. methylpolysilazanes, such as hexamethyldisilazane or hexamethylcyclotrisilazane, chlorosilanes, such as dimethylchlorosilane, trimethylchlorosilane, methylvinyldichlorosilane or dimethylvinylchlorosilane, and alkoxysilanes, such as dimethyldimethoxysilane, dimethylvinylethoxysilane or trimethylmethoxysilane, appear among the treatment compounds.

The filler can also be treated in situ, in particular with one of the above agents and more particularly with silazanes, such as hexamethyl-disilazane (hmdz). In this case, the treatment agent can be incorporated in the silicone composition before the silica, after it or on both occasions.

The term "in situ treatment of the siliceous filler" is understood to mean that the filler and the compatibilizing agent are both together in the presence of at least a portion of polyorganosiloxane silicone oil (A). In a particularly preferred way, this consists essentially in introducing compatibilizing agent (CA) on two occasions in the preparation medium:

on the one hand, before and/or substantially simultaneously with bringing together at least a portion of the silicone oil employed and at least a portion of the siliceous filler used, this introduction of CA (portion 1) being carried out one or more times and corresponding to a portion of less than or equal to 8%, preferably of less than or equal to 5% and more preferably still of less than or equal to 3% by dry weight with respect to the total filler;

and, on the other hand (portion 2), after this operation in which silicone oil and filler are brought together.

The compatibilizing agent of portion 1 is thus chosen from molecules which satisfy at least two criteria:

exhibits a strong interaction with the silica at its hydrogen bonds with itself and with the surrounding silicone oil, is itself, or its decomposition products, easily discharged from the final mixture by heating under vacuum or under a gas stream and compounds of low molecular weight are thus preferred.

The agent of portion 1 can be, for example:

a silazane, preferably disilazane, or their mixtures, hexamethyldisilazane (hmdz) being the preferred silazane, which can be used in combination with divinyltetramethyldi-silazane, a di- or preferably monofunctional hydroxylated siloxane, an amine, such as ammonia or an alkylamine of low molecular weight, such as diethylamine, an organic acid of low molecular weight, such as formic acid or acetic acid, and is preferably employed in the presence of water.

The compatibilizing agents of portion 2 can be chosen from the various silazanes and disilazanes encountered hereinabove, taken alone or as mixtures with one another, preferably from disilazanes, hexamethyldisilazane, in combination or not in combination with divinyltetramethyldisilazane, being particularly preferred.

For further details, the person skilled in the art can refer to WO-A-98 58997 or to French Patent Application 98 16510, filed on 23 Dec. 1998.

Use may also be made of an untreated silica, jointly with the use of additives which facilitate the processing (processing aids), for example hydroxylated or methoxylated silicone fluids or alternatively functional silanes.

The semi-reinforcing or bulking fillers have a particle diameter preferably of greater than 0.1 $\mu$m (micrometer) and are chosen in particular from ground quartz, calcined clays and diatomaceous earths.

Use may generally be made of 0 to 100 parts, preferably of 5 to 80 parts, of filler per 100 parts of oil (A).

The bases for silicone compositions defined in a general way hereinabove are well known to a person skilled in the art. They are described in detail in the literature and the majority are commercially available. These compositions crosslink at room temperature in the presence of atmospheric moisture and/or moisture present in the composition. They are divided into two main families. The first family is composed of single-component compositions or compositions comprising a single package which are stable on storage with the exclusion of atmospheric moisture and which cure to an elastomer with atmospheric moisture. In this case, the condensation catalyzt (C) used is a metal compound, generally a tin, titanium or zirconium compound.

Depending on the nature of the condensable or hydrolyzable groups, these single-component compositions are said to be acidic, neutral or basic.

Mention may be made, as acidic compositions, of, for example, the compositions disclosed in U.S. Pat. Nos. 3,035,016, 3,077,465, 3,133,891, 3,409,573, 3,438,930, 3,647,917 and 3,886,118.

Use may be made, as neutral compositions, of, for example, the compositions disclosed in U.S. Pat. Nos. 3,065,194, 3,542,901, 3,689,454, 3,779,986, GB-A-2 052 540, U.S. Pat. No. 4,417,042 and EP-A-69 256.

Use may be made, as basic compositions, of, for example, the compositions disclosed in U.S. Pat. Nos. 3,378,520, 3,364,160, 3,417,047, 3,742,004 and 3,758,441.

Use may also be made, according to a preferred alternative form, of single-component flowing compositions, such as those disclosed in U.S. Pat. Nos. 3,922,246, 3,956,280 and 4,143,088.

The second family, which is the preferred family in the context of the present invention, is composed of two-component compositions or compositions comprising two packages which preferably comprise an α,ω-dihydroxydiorganopolysiloxane oil (A), a silane (B) or a product originating from partial hydrolysis of this silane, and a catalyzt (C) which is a metal compound, preferably a tin compound, and/or an amine.

Examples of such compositions are disclosed in U.S. Pat. Nos. 3,678,002, 3,888,815, 3,933,729, 4,064,096 and GB-A-2 032 936.

The two-component compositions comprising:

(A): 100 parts of an α,ω-dihydroxydiorganopoly-siloxane oil with a viscosity of 50 to 300000 mPa·s, the organic radicals of which are chosen from methyl, ethyl, vinyl, phenyl and 3,3,3-trifluoropropyl radicals, at least 60%, preferably 80%, by number being methyl radicals, it being possible for up to 20% by number to be phenyl radicals and it being possible for at most 2% to be vinyl radicals, (B): from 0.5 to 15 parts of a polyalkoxysilane or polyalkoxysiloxane, (C): from 0.01 to 1 part (calculated as weight of tin metal) of a catalytic tin compound, (D): from 0 to 100 parts, preferably from 5 to 80 parts, of siliceous inorganic filler, (E): at least one additive in accordance with the invention, in particular in a proportion of 1 to 5% by weight with respect to the whole of the composition, are well suited.

The two-component silicone compositions having the following composition, expressed as parts by weight:

from 25 to 75 parts of a hydroxyl-terminated polydimethylsiloxane (PDMS) characterized by a viscosity of 5 to 100 Pa·s, from 10 to 50 parts of PDMS comprising trimethylsilyl endings which is characterized by a viscosity of 20 to 2000 mpa·s, from 15 to 30 parts of a siliceous inorganic filler, in particular silica, characterized by a specific surface of at least 90 m$^2$/g, from 3 to 10 parts of compatibilizing agent, e.g. hmdz, from 1 to 5 parts of water, from 0 to 40 parts of a ground silica filler with a mean particle size of approximately 5 to 10 μm, at least one additive in accordance with the invention, in particular in a proportion of 1 to 5% by weight with respect to the whole of the composition, are also well suited.

Such a composition can be crosslinked under cold conditions by addition of a catalyzing mixture comprising at least one crosslinking molecule, such as an at least trifunctional alkoxysilane (e.g. methyl silicate, ethyl silicate or methyltrimethoxysilane), and a catalyzt for the polycondensation of silicones, such as a tin catalyzt.

The tin catalyzts are extensively described in the above literature; this can be in particular a tin salt of a mono- or dicarboxylic acid. These tin carboxylates are described in particular in the work by Noll (Chemistry and Technology of Silicones, page 337, Academic Press, 1968, 2$^{nd}$ edition). Mention may in particular be made of the naphthenate, the octanoate, the oleate, the butyrate, dibutyltin dilaurate, dibutyltin diacetate or demethyltin didecanoate. Use may also be made, as catalytic tin compound, of the reaction product of a tin salt, in particular of a tin dicarboxylate, with poly(ethyl silicate) as disclosed in U.S. Pat. No. 3,186,963. Use may also be made of the reaction product of a dialkyldialkoxysilane with a tin carboxylate, as disclosed in U.S. Pat. No. 3,862,919. Use may also be made of the reaction product of an alkyl silicate or of an alkyltrialkoxysilane with dibutyltin diacetate, as disclosed in Belgian Patent BE-A-842 305. Use may also be made of the phenyltrimethoxysilanedimethyltin didecanoate pair.

Preference is more particularly given, among the crosslinking agents (B), to alkyltrialkoxysilanes, alkyl silicates and poly (alkyl silicate)s in which the organic radicals are alkyl radicals having from 1 to 4 carbon atoms.

The alkyl silicates can be chosen from methyl silicate, ethyl silicate, isopropyl silicate, n-propyl silicate and the polysilicates chosen from the products from the partial hydrolysis of these silicates; these are polymers composed of a high proportion of units of formula $(R^4O)_3SiO_{0.5}$, $R^4OSiO_{1.5}$, $(R^4O)_2SiO$ and $SiO_2$, the $R^4$ symbol representing the methyl, ethyl, isopropyl or n-propyl radicals. Their characterization is usually based on their silica content, which is established by quantitative determination of the product from the hydrolysis of a sample.

Use may in particular be made, as polysilicate, of a partially hydrolyzed ethyl silicate sold under the trade name "Ethyl Silicate-40®" by Union Carbide Corporation or a partially hydrolyzed propyl silicate.

The polycondensation compositions can additionally comprise from 10 to 130 parts by weight of polydimethylsiloxane oil(s) blocked at each of the chain ends by a $(CH_3)_3SiO_{0.5}$ unit, with a viscosity at 25° C. of between 10 and 5000 mPa·s, per 100 parts of oil (s) (A).

In addition, the compositions can optionally comprise adjuvants for the crosslinking, such as hydroxylated fluids, for example water, and silicones, pigments and/or specific adjuvants.

The compositions according to the invention can be shaped, extruded and in particular molded over a shape for which it is desired to take the impression and can then be cured at room temperature to an elastomer with atmospheric moisture or with addition of water. Gentle heating at a temperature of 20 to 150° C. can accelerate the curing.

A second group of silicones which can be used according to the invention relates to a polyaddition composition which can be cured to an elastomer by hydrosilylation reactions, characterized in that it comprises:

(A): at least one diorganopolysiloxane oil exhibiting, per molecule, at least two alkenyl groups, preferably vinyl groups, bonded to silicon, (B): at least one diorganopolysiloxane oil exhibiting, per molecule, at least three hydrogen atoms bonded to silicon, (C): a catalytically effective amount of a catalyst which is generally a compound of a metal from the platinum group, (D): optionally any other additive conventionally used in this type of composition, e.g. a filler, (E): at least one additive in accordance with the invention.

The amounts of (A) and (B) are generally chosen so that the molar ratio of the hydrogen atoms bonded to silicon in (B) to the vinyl radicals bonded to silicon in (A) is generally between 0.4 and 10, preferably between 0.6 and 5.

The vinyl groups in (A) and the hydrogen atoms in (B) are generally bonded to different silicon atoms.

These compositions crosslink by an addition reaction (also known as a hydrosilylation reaction), catalyzed by a compound of a metal from the platinum group, of a vinyl group of the organopolysiloxane (A) with a hydride functional group of the organopolysiloxane (B).

The vinylated organopolysiloxane (A) can be an organopolysiloxane exhibiting siloxyl units of formula (5):

$$Y_a Z_b SiO_{\frac{(4-a-b)}{2}}$$

in which Y is a vinyl group, Z is a monovalent hydrocarbonaceous group not having an unfavorable effect on the activity of the catalyzt, Z generally being chosen from alkyl groups having from 1 to 8 carbon atoms inclusive, such as the methyl, ethyl, propyl and 3,3,3-trifluoropropyl groups, and aryl groups, such as xylyl, tolyl and phenyl, a is 1 or 2, b is 0, 1 or 2 and a+b is between 1 and 3, all the other units optionally being units of mean formula (6):

$$Z_c SiO_{\frac{4-c}{2}}$$

in which Z has the same meaning as hereinabove and c has a value of between 0 and 3.

The organopolysiloxane (B) can be an organohydropolysiloxane comprising siloxyl units of formula (7):

$$H_d W_e SiO_{\frac{4-d-e}{2}}$$

in which W is a monovalent hydrocarbonaceous group not having an unfavorable effect on the activity of the catalyzt which corresponds to the same definition as Z, d is 1 or 2, e is 0, 1 or 2, and d+e has a value of between 1 and 3, all the other units optionally being units of mean formula (8):

$$W_g SiO_{\frac{4-g}{2}}$$

in which W has the same meaning as hereinabove and g has a value of between 0 and 3.

The organopolysiloxane (A) can be formed solely of units of formula (5) or can additionally comprise units of formula (6).

The organopolysiloxane (A) can exhibit a linear, branched, cyclic or network structure. The degree of polymerization is 2 or more and is generally less than 5000. Furthermore, if the organopolysiloxane (A) is linear, it exhibits a viscosity at 25° C. of less than 500000 mPa·s.

Z is generally chosen from the methyl, ethyl and phenyl radicals, 60 mol % at least of the Z radicals being methyl radicals.

The organopolysiloxanes (A) and (B) are well known and are disclosed, for example, in U.S. Pat. Nos. 3,220,972, 3,284,406, 3,436,366, 3,697,473 and 4,340,709.

Examples of siloxyl units of formula (5) are the vinyldimethylsiloxyl unit, the vinylphenylmethylsiloxyl unit, the vinylsiloxyl unit and the vinylmethylsiloxyl unit.

Examples of siloxyl units of formula (6) are the $SiO_{4/2}$, dimethylsiloxyl, methylphenylsiloxyl, diphenylsiloxyl, methylsiloxyl and phenylsiloxyl units.

Examples of organopolysiloxane (A) are dimethylpolysiloxanes comprising dimethylvinylsiloxyl ends, methylvinyldimethylpolysiloxane copolymers comprising trimethylsiloxyl ends, methylvinyldimethylpolysiloxane copolymers comprising dimethylvinylsiloxyl ends and cyclic methylvinylpolysiloxanes.

The organopolysiloxane (B) can be formed solely of units of formula (7) or additionally comprises units of formula (8).

The organopolysiloxane (B) can exhibit a linear, branched, cyclic or network structure. The degree of polymerization is 2 or more and is generally less than 5000.

The W group has the same meaning as the above Z group. Examples of units of formula (7) are:

$H(CH_3)_2 SiO_{1/2}$, $HCH_3 SiO_{2/2}$ or $H(C_6H_5)SiO_{2/2}$.

The examples of units of formula (8) are the same as those given above for the units of formula (6).

Examples of organopolysiloxane (B) are dimethylpolysiloxanes comprising hydrodimethylsilyl ends, dimethylhydromethylpolysiloxane copolymers comprising trimethylsiloxyl ends, dimethylhydromethylpolysiloxane copolymers comprising hydrodimethylsiloxyl ends, hydromethylpolysiloxanes comprising trimethylsiloxyl ends and cyclic methylvinylpolysiloxanes.

The ratio of the number of hydrogen atoms bonded to silicon in the organopolysiloxane (B) to the number of groups comprising alkenyl unsaturation of the organopolysiloxane (A) is between 0.4 and 10, preferably between 0.6 and 5.

The organopolysiloxane (A) and/or the organopolysiloxane (B) can be diluted in a nontoxic organic solvent compatible with silicones.

The network organopolysiloxanes (A) and (B) are commonly known as silicone resins.

The bases for the silicone polyaddition compositions may comprise only linear organopolysiloxanes (A) and (B), such as, for example, those disclosed in the abovementioned U.S. Pat. Nos.: 3,220,972, 3,697,473 and 4,340,709, or may, at the same time, comprise branched or network organopolysiloxanes (A) and (B), such as, for example, those disclosed in the abovementioned U.S. Pat. Nos.: 3,284,406 and 3,436,366.

The polyaddition composition can additionally comprise from 5 to 40 parts by weight of polydimethylsiloxane oil(s) blocked in each of the chain ends by a $(CH_3)_3SiO_{0.5}$ unit, with a viscosity at 25° C. of between 10 and 5000 mPa·s, per 100 parts of the organopolysiloxanes (A)+(B).

The catalysts (C) are also well known. Platinum and rhodium compounds are preferably used. Use may be made of the complexes of platinum and of an organic product disclosed in U.S. Pat. Nos. 3,159,601, 3,159,602 and 3,220,972 and European Patents EP-A-57 459, EP-A-188 978 and EP-A-190 530 and the complexes of platinum and of vinylated organopolysiloxane disclosed in the U.S. Pat. Nos. 3,419,593, 3,715,334, 3,377,432 and 3,814,730. Use may be made of the rhodium complexes disclosed in the United Kingdom patents: GB-A-1 421 136 and GB-A-1 419 769.

Platinum catalyzts are preferred. In this case, the amount by weight of catalyzt (C), calculated as weight of platinum metal, is generally between 2 and 600 ppm, in general between 5 and 200 ppm, based on the total weight of the organopolysiloxanes (A) and (B).

The preferred polyaddition compositions in the context of the present invention are those which comprise:

(A): 100 parts of a diorganopolysiloxane oil blocked at each end of its chain by a vinyldiorganosiloxyl unit, the organic radicals, bonded to the silicon atoms, of which are chosen from the methyl, ethyl and phenyl radicals, at least 60 mol % of these radicals being methyl radicals, with a viscosity of 100 to 500000, preferably of 1000 to 200000, mPa·s at 25° C.;

(B): at least one organohydropolysiloxane chosen from liquid linear or network homopolymers and copolymers exhibiting, per molecule, at least 3 hydrogen atoms bonded to different silicon atoms, the organic radicals, bonded to the silicon atoms, of which are chosen from the methyl, ethyl and phenyl radicals, and at least 60% of these radicals being methyl radicals, the product (B) being used in an amount such that the molar ratio of hydride functional groups to the vinyl groups is between 1.1 and 4;

(C): a catalytically effective amount of a platinum catalyzt;

(E): at least one additive according to the invention, in particular in a proportion of 1 to 5% by weight with respect to the whole of the composition.

Even more preferably, up to 50% by weight of the polymer (A) is replaced by a network copolymer comprising trimethylsiloxyl, methylvinylsiloxyl and $SiO_{4/2}$ units, in which copolymer from 2.5 to 10 mol % of the silicon atoms comprise a vinyl group and in which copolymer the molar ratio of the trimethylsiloxyl groups to the $SiO_{4/2}$ groups is between 0.5 and 1.

The compositions according to the invention can additionally comprise reinforcing or semi-reinforcing or bulking fillers (D) as described hereinabove in the context of the polycondensation compositions.

Use may generally be made of 5 to 100 parts, preferably of 5 to 50 parts, of filler per 100 parts of the sum of the organopolysiloxanes (A)+(B).

The polyaddition compositions are generally stored in two packages. This is because they crosslink as soon as all their constituents are mixed. If it is desired to delay this crosslinking in order to obtain good homogenization of the active material, an inhibitor of the platinum catalyzt can be added to the composition.

These inhibitors are well known. Use may in particular be made of organic amines, silazanes, organic oximes, dicarboxylic acid diesters, acetylenic alcohols, acetylenic ketones or vinylmethylcyclopolysiloxanes (see, for example, U.S. Pat. Nos. 3,445,420 and 3,989,667). The inhibitor is used in a proportion of 0.005 to 5 parts, preferably of 0.01 to 3 parts, per 100 parts of the constituent (A).

In order to obtain good homogenization in the distribution of the active material, it is in fact desirable for the silicone matrix to exhibit a degree of viscosity of the order of 5000 to 30000 mPa·s at 25° C. Such a viscosity can be obtained by a precrosslinking, the latter being blocked at the desired viscosity by addition of an inhibitor. Sufficient time is thus available to thoroughly homogenize the active material within the silicone matrix. The crosslinking is then brought to completion by heating the matrix at a temperature such that the inhibitor no longer has an effect on the catalytic action of the platinum.

The compositions according to the invention can be cold kneaded as they are and can be shaped, in particular molded over the shape to be reproduced.

According to a distinctive characteristic of the invention, the additives according to the invention are used in combination with one another and/or with conventional additives, in particular conventional additives such as those disclosed in EP-A-787 766 and FR-A-2 773 165. More generally, they can be used in combination [lacuna] additives such as:

(1i) antioxidizing additives comprising, in their structure, at least 2, preferably 4, groups of formula

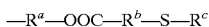

in which:
the $R^a$ radicals are, independently of one another, chosen from divalent hydrocarbonaceous groups having from 1 to 6 carbon atoms, preferably linear or branched, in particular linear, alkylenes, in particular having from 1 to 4 carbon atoms, preferably 1 and 2;
the $R^b$ radicals are monovalent hydrocarbonaceous groups, in particular alkylene groups and preferably —$CH_2$—$CH_2$—;
the $R^c$ radicals are chosen from alkyls having from 1 to 40 carbon atoms, preferably from 1 to 20 carbon atoms.

These structures are preferably connected to a carbon, in particular a tetravalent carbon. Mention may in particular be made of pentaerythritol tetra(laurylthiopropionate) (PETL—CAS 29 598-76-3).

(2i) Additives of formula

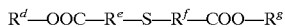

in which:
the $R^d$ and $R^f$ radicals, independently of one another, are chosen from linear or branched alkyl radicals having from 1 to 40 carbon atoms, preferably from 1 to 20 carbon atoms;
the $R^e$ and $R^f$ radicals, independently of one another, are divalent hydrocarbonaceous groups, in particular alkylene groups and preferably —$CH_2$—$CH_2$—.

Mention may thus be made of the following compounds: tridecyl thiodipropionate, distearyl 3,3'-thiodipropionate or dilauryl 3,3'-thiodipropionate.

(3i) Phosphites, in particular alkyl phosphites, mixed aryl alkyl phosphites, aryl phosphites and various phosphites, e.g.:
triphenyl phosphite, triisodecyl phosphite, trilauryl phosphite, dilauryl phosphite, diphenyl isodecyl phosphite, diphenyl isooctyl phosphite, diphenyl 2-ethylhexyl phosphite, diisodecyl phenyl phosphite, trimonononylphenyl phosphite, 2,4-dinonylphenyl di(4-monononylphenyl)phosphite, tris(2,4-di-tert-butylphenyl)phosphite (CAS 31570-04-4), 2,2-methylenebis(4,6-di(t-butyl)phenyl)octyl phosphite, a product sold under the name Sandostab® P-EPQ by Sandoz AG, Basle, Switzerland, $[CH_3(CH_2)_{11}S]_3P$ or 2,2'-ethylidenebis(4,6-di(t-butyl)phenyl) fluorophosphite CAS 118337-09-0.

(4i) Sterically hindered phenols, sterically hindered bisphenols or sterically hindered thiobisphenols, such as in particular those disclosed in EP-A-787 766 and EP-A-854 167. Mention may be made, by way of examples, of:
2,6-di(t-butyl)phenol, 2,6-di(t-butyl)-4-methylphenol, octadecyl 3,5-di(t-butyl)-4-hydroxyhydrocinnamate, 4,4'-methylenebis(2,6-di(t-butyl)phenol), 4,4'-methylenebis(2,6-dimethylphenol), 2,2'-methylenebis(4-methyl-6-(t-butyl)phenol), 2,2'-ethylidenebis(4,6-di(t-butyl)phenol), 2,2'-methylenebis(4-methyl-6-(1-methylcyclohexyl) phenol), 4,4'-butylidenebis(6-t-butyl-3-methylphenol), 1,1'-thiobis(2-naphthol), 2,2'-thiobis (4-methyl-6-t-butylphenol), 2,2'-isobutylidenebis(4, 6-dimethylphenol), monomethacrylate ester of 2,2'-methylenebis(4-ethyl-6-t-butylphenol), 1,3,5-trimethyl-2,4,6-tris(3,5-di(t-butyl)-4-hydroxybenzyl)benzene, 4,4'-thiobis(6-t-butyl-3-methylphenol), 4,4'-thiobis(4,6-di(t-butyl) phenol), 2,6-di(t-butyl)-p-cresol, 2-t-butyl-4-methoxyphenol, 3-t-butyl-4-methoxyphenol, alkyl-, dialkyl- or trialkyl-substituted phenols with $C_1$ to $C_{30}$ alkyl, styrylphenol, distyrylphenol, tristyrylphenol, tetrakis (methylene 3-(3,5-di(t-butyl)-4-hydroxyphenyl) propionate)methane, 1,3,5-tris(3,5-di(t-butyl)-4-hydroxybenzyl)-s-triazine-2,4,6(1H,3H,5H)-trione, 2,4-bis(n-octylthio)-6-(4-hydroxy-3,5-di(t-butyl) amino)-1,3,5-triazine, 4-(hydroxymethyl)-2,6-di(t-butyl)phenol or 2,2-diphenyl-1-picrylhydrazyl.

(5i) Metal thiophosphates, in particular zinc thiophosphates, such as zinc dialkyldithiophosphate or zinc diaryldithiophosphate of formula Zn[S—P(S)—(OR″)$_2$]$_2$, in which R″ is a monovalent hydrocarbonaceous residue having from 1 to 14 carbon atoms, preferably methyl, ethyl, n-propyl, n-butyl, n-pentyl, n-hexyl, 2-ethylhexyl, n-octyl, phenyl or tolyl (EP-A-787 766). It is preferably zinc di(n-hexyl)dithiophosphate, zinc di(2-ethylhexyl)dithiophosphate or zinc diphenyldithiophosphate.

(6i) aromatic amines, such as in particular those disclosed in EP-A-787 766. Mention may be made, by way of examples, of: N-phenylbenzylamine, N-phenyl-1-naphthylamine, 4,4'-di(α,α'-dimethylbenzyl)diphenylamine, 4,4'-di(2,4,4-trimethylpentyl)diphenylamine, N,N'-diphenyl-1,4-phenylenediamine, N-phenyl-N'-(1,3-dimethyl-butyl)-1,4-phenylenediamine or 4-anilinophenyl methacrylate.

(7i) Hindered amines referred to as HALS of N—OR, N—R and N—H type (Hindered Amine Light Stabilizers—see Oxidation Inhibition in Organic Materials, Vol. II, Chapter 1: Hindered amines as photostabilizers, Jiri Sedlar). Reference may also be made to EP-A-432 096, EP-A-787 766 and FR-A-773 165. Typical commercial amines are sold under the name Tinuvin® by Ciba-Geigy, Novartis or Sankyo. Those preferred are of N—OR type, i.e.:

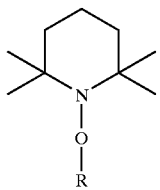

in particular those comprising at least one group:

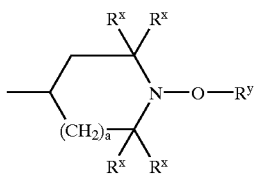

in which R$^y$ is hydrogen or a linear or branched C$_1$ to C$_{18}$ alkyl, optionally substituted by one or more phenyl groups, or a C$_5$ to C$_6$ cycloalkyl or benzyl, a is 0 or 1, preferably 1, and the R$^x$ radicals, which are identical to or different from one another, are chosen from linear or branched C$_1$ to C$_3$ alkyl, phenyl and benzyl radicals.

Preference is given, among these compounds, to the sebacates, in particular those of formula:

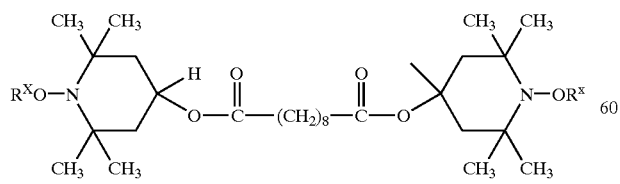

with the meanings as above, and in particular Tinuvin® 123: bis(1-octyloxy-2,2,6,6-tetramethyl-4-piperidyl) sebacate of expanded formula:

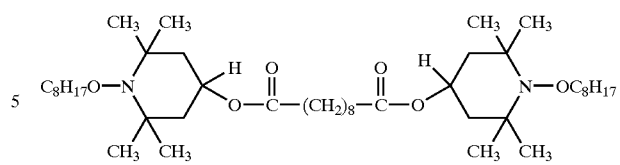

Mention may be made, as general reference with regard to antioxidants which are potentially usable as co-additive, of Martin Dexter, Antioxidants, Encyclopedia of Chemical Technology, Vol. 3, p. 424–447, 4th edition, 1990.

Preference is given, among all the conventional additives, to the use of PETL or compounds of sebacate type, in particular bis(1-octyloxy-2,2,6,6-tetramethyl-4-piperidyl) sebacate (Tinuvin® 123).

Another subject-matter of the present invention is a process for the preparation of silicone elastomer molds, intended in particular for the molding of polyester items, in which one or more additives in accordance with the invention is/are incorporated in the silicone composition, optionally in combination with conventional additives. In the context of this process, additives according to the invention, additional conventional additives and silicone compositions can be as described elsewhere in the present application.

A further subject-matter of the invention is silicone elastomer molds capable of being obtained by crosslinking of a polyaddition or polycondensation composition as described above. Another subject-matter of the invention is the silicone elastomer obtained.

The present invention will now be described in more detail with the help of embodiments taken as nonlimiting examples.

EXAMPLE 1

Preparation of Methyl Laurylthiopropionate

This methyl ester is obtained by addition of dodecanethiol to methyl acrylate:

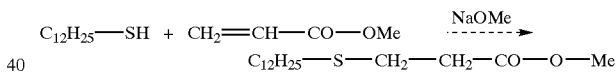

Principle of the Reaction

Dodecanethiol (101.2 g, 0.5 mol) is weighed into a 205 ml three-necked round-bottomed flask equipped with a reflux condenser and a dropping funnel. Sodium methoxide (405 mg, 7.5 mmol) is subsequently added. Methyl acrylate (49.9 g, 0.58 mol) is weighed into the dropping funnel. The round-bottomed flask is placed in an ice bath and the methyl acrylate is run in slowly while maintaining the temperature at room temperature; a slight exotherm is observed. Stirring is maintained at room temperature for 18 hours. On the following day, the heterogeneous mixture is filtered under nitrogen pressure. The filtrate is passed through celite on a sintered glass funnel and the residue is rinsed with toluene. The toluene and the excess methyl acrylate are distilled off (115° C. and 4 mm of Hg, 5 hours). Distillation is halted.

Characteristics of the methyl laurylthiopropionate:
Physical state: liquid (boiling point: 162–163.5° C.)
Molecular mass: 288.49
Refractive index: 1.466 at 589 nm and 20° C.

EXAMPLE 2

Preparation of a Silicone Composition Which Crosslinks at Room Temperature by a Polycondensation Reaction 1) Base mixture: Rhodorsil® RTV V-2015, sold by Rhodia Silicones, St-Fons, France, with 0.5% of Tinuvin 123 (Ciba-Geigy)=bis(1-octyloxy-2,2,6,6-tetramethyl-4-piperidyl) sebacate; the desired amount of additive MeLTP, AO-23 and DTDTDP, which are liquid at room temperature or after melting in the case of PETL (melting point 44° C.), is added thereto.

2) Catalyzed mixture:

The catalyzt Rhodorsil® Catalyzt HI Pro Green, sold by Rhodia Silicones, is added to the base mixture.

3) Processing of the RTV silicone:

The catalyzed base mixture is homogenized and degassed. The product, thus degassed, is subsequently cast in appropriate molds. The overmolded product (which will constitute a mold) is crosslinked at room temperature (23° C.) and the molds are emptied after 3 days. The characteristics of the elastomer are then as follows:

| Hardness Sh A | Tear strength kN/m | Tensile strength MPa | Elongation at break % |
|---|---|---|---|
| 17 | 18 | 3.6 | 450 |

4) Additives

The impact of methyl laurylthiopropionate on the resistance to polyesters was compared with that which can result from other antioxidants of higher molecular weight.

Characteristics of the additives:

| References | Melting point (° C.) | Boiling point (° C.) | Molecular mass |
|---|---|---|---|
| PETL | ~44 | — | ~1162 |
| MELTP | — | 162–163.5 | ~288 |
| DTDTDP | — | 265 | ~542 |
| AO-23 | — | — | ~900 |

Structure and source of the products studied

| References | Supplier | Chemical structure |
|---|---|---|
| PETL Pentaerythritol tetra(laurylthiopropionate) | Palmarole S.A. | $C[CH_2-O-OC-CH_2-CH_2-S-C_{12}H_{25}]_4$ |
| DTDTDP Ditridecyl thiodipropionate | Witco Akcros | $S[CH_2-CH_2-COOC_{13}H_{27}]_2$ |
| MeLTP Methyl laurylthiopropionate | Synthesized in Example 1 | $C_{12}H_{25}-S-CH_2-CH_2-CO-O-Me$ |
| AO-23 | Palmarole S.A. | (i) |

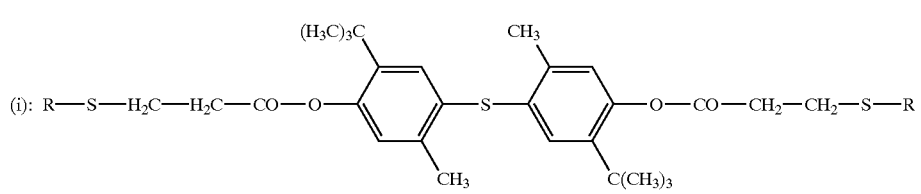

(i): $R-S-H_2C-H_2C-CO-O-\text{[aryl]}-S-\text{[aryl]}-O-CO-CH_2-CH_2-S-R$ where R is an aliphatic $C_{12}$ to $C_{14}$ derivative.

DTDTDP, MeLTP and AO-23 are liquid at room temperature, whereas PETL is a solid, the melting point of which lies at approximately 40° C.–45° C.

5) Polyester resins

This entire study was carried out with a polyester resin comprising 40% of styrene sold under the name Synolite® 0328-A-1 and distributed by DSM (BASF), France. This resin is catalyzed by the addition of 2% of Promox 200 (45% solution of methyl ethyl ketone peroxide in a mixture of organic solvents: phthalates and diacetone alcohol) and of 0.2% of accelerator (6% solution of cobalt octoate in white spirit). The gel time of this polyester resin is 25 min, the molded component is removed from the mold in approximately 30 min and the crosslinking is completed in approximately 75 min.

6) Methods 6-1—Introduction of the additives into the RTVs: these additives are introduced in the liquid form by direct dispersion in the base of the RTV using a propeller stirrer or manually. In the case of PETL, this product is melted at 50° C. before being dispersed in the RTV.

6-2—Evaluation of the resistances to resins: the resistance to resins was evaluated using molding tests which consist in carrying out, in a small mold of the RTV to be tested, successive castings and removals from the mold every 30 min of a polyester resin until part of the mold is torn off at the time of removal from the mold. Two types of molds, representative of different operating conditions, were used.

a first represents part of the face of a statue; it is obtained according to the technique of molding under a case. In the context of this experimental model, the tearing always takes place at the same place in a brittle region which is situated in the hair of the figurine; the geometry of this brittle region corresponds in fact to a 1×2 cm strip with a thickness of 1 mm.

During successive molding operations, a modification in the appearance of the surface of the molds (whitening, hardening, swelling) and the presence of crumpled or sticky regions at the surface of the molded polyester items are also recorded. The whitening phenomenon reveals the progressive formation of polystyrene in the surface regions of the molds; the imperfections which are present at the surface of the molded items reflect phenomena of inhibition of the crosslinking of the resin; this inhibition results from the exudation at the mold/molded component interface.

The second type of mold used in these tests is a mold comprising spikes. This mold is cubic in shape (3.7× 3.7×3.7 cm; thickness of the walls: 1.5 cm). 10 spikes with a height of 1 cm and a diameter of 0.2 cm are evenly distributed over the bottom of the mold. It is the tearing off of the spikes positioned at the bottom of these molds which allows the resistance to resins to be characterized.

7) Other evaluation methods:

The other characteristics are determined according to conventional procedures.

Brookfield viscosity

Shore A (Sh A) hardness: ASTM Standard D 2240

Tensile strength and elongation at break: ASTM Standard D 412

Tear test: ASTM Standard D 624, test specimen B

8) Results:

Three types of results are presented hereinbelow:—

Mechanical properties of the RTV doped with the various antioxidants (containing 0.5 parts of Tinuvin and xx parts of one of the antioxidants which have just been described) and crosslinked with the catalyzt described under 2), except in the case of DTDTDP; in this case, the RTV is crosslinked with a catalyzt comprising: 27.80% of phenyltrimethoxysilane, 2.20% of tin salt (dimethyltin dineodecanoate), 33.24% of Mediaplast BSP solvent (mixture of 85% of ($C_{10}$–$C_{16}$)alkylbenzene and of 15% of organic solvent comprising ester functional groups, sold by Kettlitz), 11.76% of BC 589-BSP (coloring base: Mediaplast BSP 90.15 parts, Silica A-130 9 parts, Chromophthal Red BRN 0.85 parts) and 25.00% of DTDTDP.

Resistance to Synolite® 328 with the mold comprising spikes;

Resistance to Synolite® 328 characterized with the figurine mold.

8-1—Mechanical properties:

TABLE

Impact of the additives on the mechanical properties

| Anti-oxidant | Content | Hardness Sh A | Tear strength kN/m | Tensile strength MPa | Elongation at break % |
|---|---|---|---|---|---|
| Controls* | — | 17 | 18 | 3.6 | 450 |
| DTDTDP | 2.5% | 15 | — | — | — |
| AO-23 | 1.5% | 15 | 20 | 3.3 | 440 |
| PETL | 1.5% | 15 | 14 | 2.8 | 420 |
| MeLTP | 2.5% | 14 | 18 | 2.9 | 450 |

*RTV + catalyzt 8-2—Resistance to polyesters-molds comprising spikes:

The results of the characterizations obtained with the molds comprising spikes are given in the following table. The levels of resistance to polyesters are characterized by the number of castings/removals from the mold which can be carried out before the first spike is torn off.

| Antioxidant | Content | Number of items obtained |
|---|---|---|
| Controls | 0% | 44*, 52** |
| MeLTP | 0.75% | 61* |
| MeLTP | 2.5% | 73*, 73** |

*first series of tests
**second series of tests

These results show the improvement in the resistance to polyesters of the molds in the presence of MeLTP.

8-3—Resistance to polyesters-figurine molds:

The results which were obtained with this type of mold appear in the following table:

| Antioxidant | Content | Number of items obtained |
|---|---|---|
| Controls | 0% | 74 |
| AO-23 | 1.5% | 85 |
| PETL | 1.5% | 91 |
| DTDTDP | 2.5% | 95 |
| MeLTP | 0.75% | 136 |
| MeLTP | 1.5% | 179 |
| MeLTP | 2.5% | >200 |

The MeLTP stands out sharply: the tests were halted after 200 castings for the 2.5%.

EXAMPLE 3

Example 2 can be repeated using the following composition:

1) Base Mixture:

Part A 1. 420 parts of a hydroxy-terminated PDMS characterized by a viscosity of 18 Pa·s,
2. 20 parts of water,
3. 44 parts of hmdz
4. 190 parts of a reinforcing silica characterized by an expanded specific surface of 160 1 $m^2/g$,
5. 112 parts of a PDMS comprising trimethylsilyl endings with a viscosity of 50 mPa·s,
6. 12 parts of a hydroxy-terminated PDMS characterized by a viscosity of 70 mPa·s
7. 4 parts of water.

These ingredients are added in the abovementioned order to a laboratory arm mixer with a capacity of 1.5 liters by applying the following process:

homogenization for approximately 15 min after introduction of items 1 to 3, gradual incorporation of component 4 over approximately 1 hour, additional homogenization for 30 min, discharge of the volatile species under vacuum at 120° C., cooling, addition of constituents 5 to 7, homogenization for 45 min.

A preparation referred to as RTVA is thus obtained. The additive is added as indicated in Example 2.

2) Catalyzed Mixture:

Part B 28 parts of phenyltrimethoxysilane 2 parts of dimethyltin didecanoate 68 parts of a trimethylsilyl-terminated PDMS with a viscosity of 100 mPa·s.

The catalyzed mixture is prepared in a simple mixer of the type with a central shaft; it is used in a proportion of 10 parts per 100 parts of RTVA.

EXAMPLE 4

Same composition as in Example 1, with or without Tinuvin 123.

| Additive | Without additive or Tinuvin or MeLTP | 2.5% MeLTP | 0.5% Tinuvin 123 2.5% MeLTP |
|---|---|---|---|
| Number of molding operations (molds/spikes) | 48 | 67 | 72 |

These results show that: a) the addition of MeLTP alone already results in an improvement of the order of 39%, b) the improvement in the effect of the MeLTP by virtue of the addition of Tinuvin.

What is claimed is:

1. A method for increasing the longevity of molds made of silicone elastomer which crosslinks by a polyaddition or polycondensation reaction comprising using an additive capable of stabilizing the silicone elastomer constituting the mold with respect to the materials to be molded, the additive corresponding to the following formula (1):

$$R^1-S-CH_2-CH_2-\underset{\underset{O}{\|}}{C}-O-R^2$$

in which $R^1$ and $R^2$ are linear or branched alkyl radicals or cycloaliphatic radicals having from 1 to 40 carbon atoms.

2. The method as claimed in claim 1, wherein $R^1$ and $R^2$ are such that $R^1+R^2 \leq 20$.

3. The method as claimed in claim 2, wherein $6 \leq R^1+R^2 \leq 18$.

4. The method as claimed in claim 2, wherein $10 \leq R^1+R^2 \leq 18$.

5. The method as claimed in claim 1, wherein $R^1$ and $R^2$ are such that $R^1+R^2 > 20$.

6. The method as claimed in claim 5 for the molding of objects having reliefs with a depth or thickness of greater than or equal to 1 millimeter and with a width or diameter of less than 1 to 5 mm.

7. The method as claimed in claim 1, wherein the additive is employed at between 0.1 and 15% by weight with respect to the overall silicone composition.

8. The method as claimed in claim 7, wherein the additive is employed at between 0.2 and 10% by weight with respect to the silicone composition.

9. The method as claimed in claim 1, wherein the composition comprises another stabilization additive.

10. The method as claimed in claim 1, wherein the stabilization of the constituent silicone elastomers of molds is intended for the molding of polyester items in order to prevent, within the silicone elastomer, the polymerization of the styrene resulting from the polyester resin, without harming the polymerization at the core and at the surface of the polyester.

11. The method as claimed in claim 1, which makes it possible to obtain a number of molding operations per mold which is increased by more than 20% with respect to an additive-free elastomer.

12. A method for increasing the longevity of molds made of silicone elastomer which crosslinks by a polyaddition or polycondensation reaction, the method comprising using an additive capable of stabilizing the silicone elastomer constituting the mold with respect to the materials to be molded, the additive corresponding to the following formula (1):

$$R^1-S-CH_2-CH_2-\underset{\underset{O}{\|}}{C}-O-R^2$$

in which $R^1$ and $R^2$ are linear or branched alkyl radicals or cycloaliphatic radicals having from 1 to 40 carbon atoms, wherein the additive comprises methyl laurylthiopropionate MeLTP:

$$C_{12}H_{25}-S-CH_2-CH_2-CO-O-CH_3.$$

13. A method for increasing the longevity of molds made of silicone elastomer which crosslinks by a polyaddition or polycondensation reaction, the method comprising using an additive capable of stabilizing the silicone elastomer constituting the mold with respect to the materials to be molded, the additive corresponding to the following formula (1):

$$R^1-S-CH_2-CH_2-\underset{\underset{O}{\|}}{C}-O-R^2$$

in which $R^1$ and $R^2$ are linear or branched alkyl radicals or cycloaliphatic radicals having from 1 to 40 carbon atoms, wherein $R^1$ and $R^2$ are such that $R^1+R^2 \leq 20$ and, further involving a second additive wherein $R^1$ and $R^2$ are such that $R^1+R^2 > 20$.

14. A method for increasing the longevity of molds made of silicone elastomer which crosslinks by a polyaddition or polycondensation reaction, the method comprising using an additive capable of stabilizing the silicone elastomer constituting the mold with respect to the materials to be molded, the additive corresponding to the following formula (1):

$$R^1-S-CH_2-CH_2-\underset{\underset{O}{\|}}{C}-O-R^2$$

in which $R^1$ and $R^2$ are linear or branched alkyl radicals or cycloaliphatic radicals having from 1 to 40 carbon atoms, wherein the composition comprises another stabilization additive selected from the group consisting of:
  phosphates,
  sterically hindered phenols,
  aromatic amines and HALS hindered amines,
  metal thiophosphates,
  metal salts with an oxidizing action,
  additives comprising, in their structure, at least 2 groups of formula $$-R^a-OOC-R^b-S-R^c$$

in which:
    the $R^a$ radicals are, independently of one another, selected from the group consisting of divalent hydrocarbonaceous groups having from 1 to 6 carbon atoms;
    the $R^b$ radicals are monovalent hydrocarbonaceous groups;
    the $R^c$ radicals are selected from the group consisting of alkyls having from 1 to 40 carbon atoms, and
  additives of formula $R^d-OOC-R^e-S-R^f-COO-R^g$
  in which:
    the $R^d$ and $R^g$ radicals, independently of one another, are selected from the group consisting of linear or branched alkyl radicals having from 1 to 40 carbon atoms;

the $R^e$ and $R^f$ radicals, independently of one another, are divalent hydrocarbonaceous groups.

15. The method as claimed in claim 14, wherein the composition comprises pentaerythritol tetra (laurylthiopropionate).

16. The method as claimed in claim 14, wherein the composition comprises an HALS hindered amine of N—OR type, comprising at least one group:

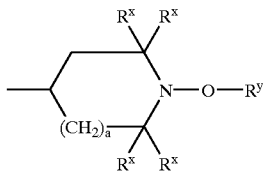

in which $R^y$ is hydrogen or a linear or branched $C_1$ to $C_{18}$ alkyl, optionally substituted by one or more phenyl groups, or a $C_5$ to $C_6$ cycloalkyl or benzyl, a is 0 or 1, and the $R^x$ radicals, which are identical to or different from one another, are selected from the group consisting of linear or branched $C_1$ to $C_3$ alkyl, phenyl and benzyl radicals.

17. The method as claimed in claim 16, wherein the composition comprises a sebacate of formula:

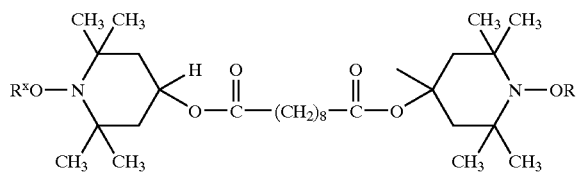

the $R^x$ radicals, which are identical to or different from one another, are selected from the group consisting of linear or branched $C_1$ to $C_3$ alkyl, phenyl and benzyl radicals.

18. The method as claimed in claim 17, wherein the composition comprises bis(1-octyloxy-2,2,6,6-tetramethyl-4-piperidyl) sebacate.

19. A precursor silicone composition of a silicone elastomer which can be used for the formation of molds for the molding of polyester items, comprising, as a stabilization additive, at least one additive corresponding to the following formula (1):

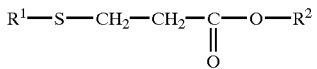

in which $R^1$ and $R^2$ are linear or branched alkyl radicals or cycloaliphatic radicals having from 1 to 40 carbon atoms.

20. A silicone composition as claimed in claim 19, which comprises one or more additives.

21. A composition as claimed in claim 19, wherein the additive is employed at between 0.1 and 15% by weight with respect to the silicone composition.

22. A composition as claimed in claim 19, wherein the additive is employed at between 0.2 and 10% by weight with respect to the silicone composition.

23. A composition as claimed in claim 19, comprising:
    (A) a diorganopolysiloxane oil exhibiting reactive groups selected from the group consisting of i) condensable, hydrolyzable or hydroxyl terminal groups and 2i) alkenyl groups, bonded to silicon;
    (B) optionally a compound selected from the group consisting of silanes comprising condensable or hydrolyzable groups, in the case where (A) is selected from the group i), and of diorganopolysiloxane oil carrying hydrogen atoms, in the case where (A) is selected from the group 2i); p1 (C) a catalyst;
    (D) optionally any other additive conventionally used in the type of composition under consideration.

24. A method of molding an object, the method comprising molding the object with a mold made of a silicone elastomer which crosslinks by a polyaddition or a polycondensation reaction, wherein the silicone elastomer is stabilized with respect to the object being molded with an additive corresponding to the formula (1):

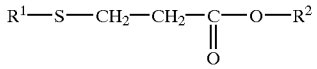

in which $R^1$ and $R^2$ are linear or branched alkyl radicals or cycloaliphatic radicals having 1 to 40 carbon atoms.

* * * * *